(12) United States Patent
Higashiyama

(10) Patent No.: US 9,152,329 B2
(45) Date of Patent: Oct. 6, 2015

(54) INFORMATION PROCESSING DEVICE, STORAGE PROCESSING METHOD, AND COMPUTER READABLE RECORDING MEDIUM HAVING PROGRAM STORED THEREIN

(71) Applicant: FUJITSU LIMITED, Kawasaki-shi, Kanagawa (JP)

(72) Inventor: Takashi Higashiyama, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 14/075,250

(22) Filed: Nov. 8, 2013

(65) Prior Publication Data

US 2014/0173233 A1   Jun. 19, 2014

(30) Foreign Application Priority Data

Dec. 19, 2012   (JP) .................................. 2012-276468

(51) Int. Cl.
| | |
|---|---|
| *G06F 3/00* | (2006.01) |
| *G06F 3/06* | (2006.01) |
| *G06F 11/14* | (2006.01) |
| *G06F 11/07* | (2006.01) |
| *G06F 17/30* | (2006.01) |
| *G06F 11/20* | (2006.01) |

(52) U.S. Cl.
CPC .............. *G06F 3/0619* (2013.01); *G06F 3/065* (2013.01); *G06F 3/0674* (2013.01); *G06F 11/0727* (2013.01); *G06F 11/0778* (2013.01); *G06F 11/1441* (2013.01); *G06F 11/2015* (2013.01); *G06F 17/30362* (2013.01)

(58) Field of Classification Search
CPC ......................... G06F 17/30362; G06F 3/0619
See application file for complete search history.

(56) References Cited

U.S. PATENT DOCUMENTS

2008/0172429 A1* 7/2008 Lin et al. ........................ 707/205

FOREIGN PATENT DOCUMENTS

| JP | 2005-293085 | 10/2005 |
|---|---|---|
| JP | 2008-77669 | 4/2008 |

* cited by examiner

*Primary Examiner* — Zachary K Huson
(74) *Attorney, Agent, or Firm* — Staas & Halsey LLP

(57) ABSTRACT

An information processing device includes: a calculator that calculates the number of pages used for storing management information in a first storage medium; a storage processor that sets pages corresponding to the calculated number of pages as free pages and stores the management information in the set free pages to thereby store the management information in the first storage medium; and an update processor that performs a process of updating position management information that indicates a storage position of the management information in the first storage medium. The information processing device can quickly write out logs on a memory.

15 Claims, 8 Drawing Sheets

FIG. 2A
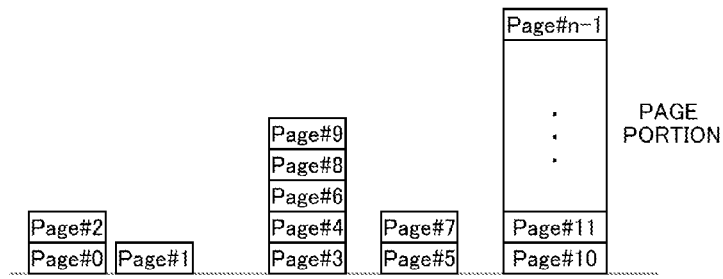
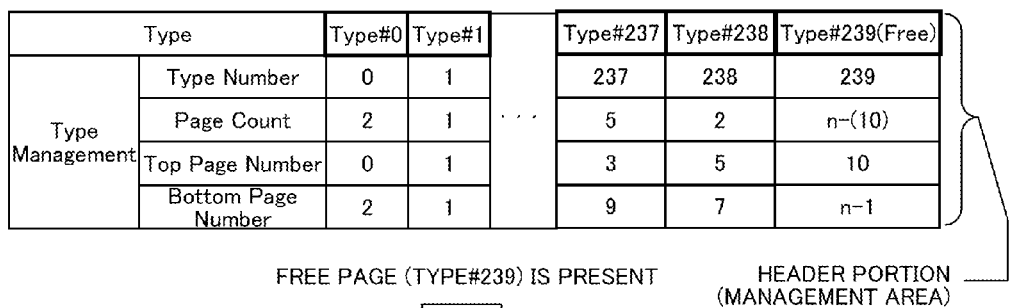
FREE PAGE (TYPE#239) IS PRESENT
HEADER PORTION (MANAGEMENT AREA)
※ASSIGN FREE PAGE
FIG. 2B
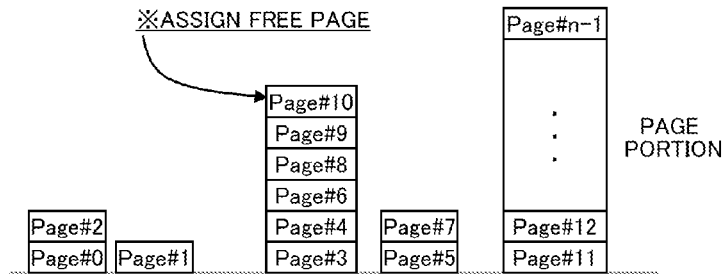
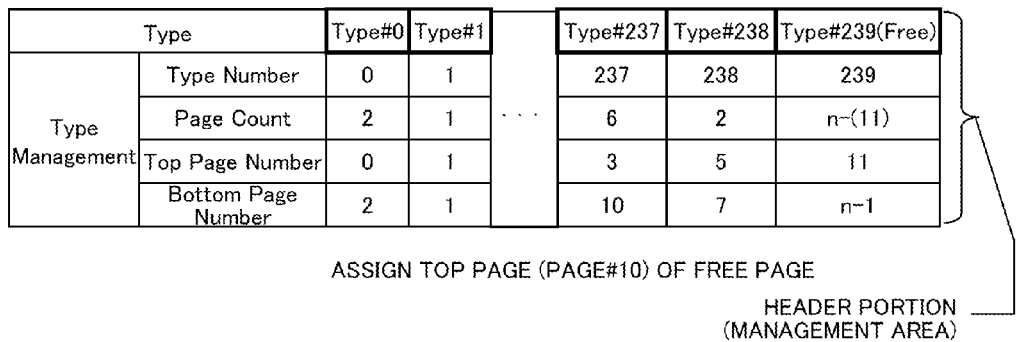
ASSIGN TOP PAGE (PAGE#10) OF FREE PAGE
HEADER PORTION (MANAGEMENT AREA)

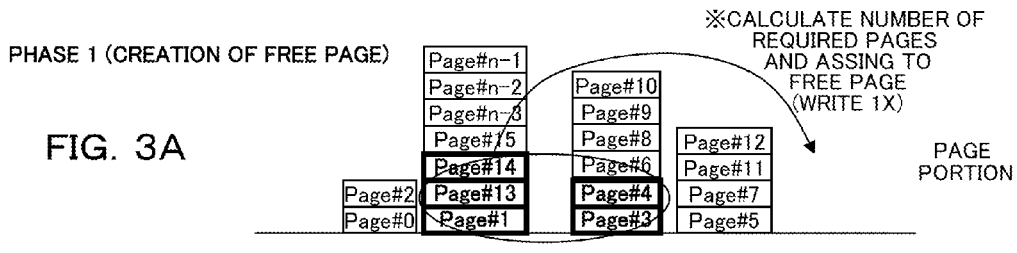

FIG. 4

| Type | Type#0 | Type#1 | Type#2 | ... | Type#237 | Type#238 |
|------|--------|--------|--------|-----|----------|----------|
| Used Size | xxxx byte | yyyy byte | 987654 byte | | zzzz byte | zzzz byte | and a backup memory and which has a function of storing data on a cache that stores I/O data to a disk in the backup memory in the event of power-cut is known. Moreover, in a processing sequence during the occurrence of power-cut, write-out of logs (fault information or the like) accumulated on a memory is also performed.

INFORMATION PROCESSING DEVICE, STORAGE PROCESSING METHOD, AND COMPUTER READABLE RECORDING MEDIUM HAVING PROGRAM STORED THEREIN

CROSS-REFERENCE TO RELATED APPLICATIONS

This application is based upon and claims the benefit of priority of the prior Japanese Patent Application No. 2012-276468, filed on Dec. 19, 2012, the entire contents of which are incorporated herein by reference.

FIELD

The embodiment(s) discussed herein is (are) directed to an information processing device, a storage processing method, and a computer readable recording medium having a program stored therein.

BACKGROUND

A storage device which includes a backup power supply and a backup memory and which has a function of storing data on a cache that stores I/O data to a disk in the backup memory in the event of power-cut is known. Moreover, in a processing sequence during the occurrence of power-cut, write-out of logs (fault information or the like) accumulated on a memory is also performed.
[Patent Literature 1] Japanese Laid-open Patent Publication No. 2005-293085
[Patent Literature 2] Japanese Laid-open Patent Publication No. 2008-77669

However, in such a conventional storage device, when a cache size increases with an increase in the size of a mounted memory, the time (write-out time) required for writing out data of the cache to the backup memory increases.

On the other hand, since the capacity of a backup power supply is limited, when the time required for writing out cache data increases, the time allocatable to the log write-out process decreases. Thus, there is a problem in that writing out logs on a memory needs to be performed in a short time.

SUMMARY

According to an aspect of the embodiment, there is provided an information processing device including: a first storage medium; a calculator that calculates the number of pages used for storing management information in the first storage medium; a storage processor that sets pages corresponding to the calculated number of pages as free pages and stores the management information in the set free pages to thereby store the management information in the first storage medium; and an update processor that performs a process of updating position management information that indicates a storage position of the management information in the first storage medium.

According to another aspect of the embodiment, there is provided a storage processing method of storing management information in a first storage medium, the method including: calculating the number of pages used for storing the management information in the first storage medium; setting pages corresponding to the calculated number of pages as free pages and storing the management information in the set free pages to thereby store the management information in the first storage medium; and updating position management information that indicates a storage position of the management information in the first storage medium.

According to another aspect of the embodiment, there is provided a computer readable recording medium having a program stored therein, the program causing a computer including a first storage medium to execute the processes of: calculating the number of pages used for storing management information in the first storage medium; setting pages corresponding to the calculated number of pages as free pages and storing the management information in the set free pages to thereby store the management information in the first storage medium; and updating position management information that indicates a storage position of the management information in the first storage medium.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2A and 2B are diagrams for describing a method of managing logs in the storage system as an example of the embodiment;

FIGS. 3A, 3B, and 3C are diagrams for describing a method of managing logs in a second mode in the storage system as an example of the embodiment;

FIG. 4 is a diagram illustrating used sizes of logs stored in a memory log area of the storage system as an example of the embodiment;

DESCRIPTION OF EMBODIMENT(S)

Figure 1:
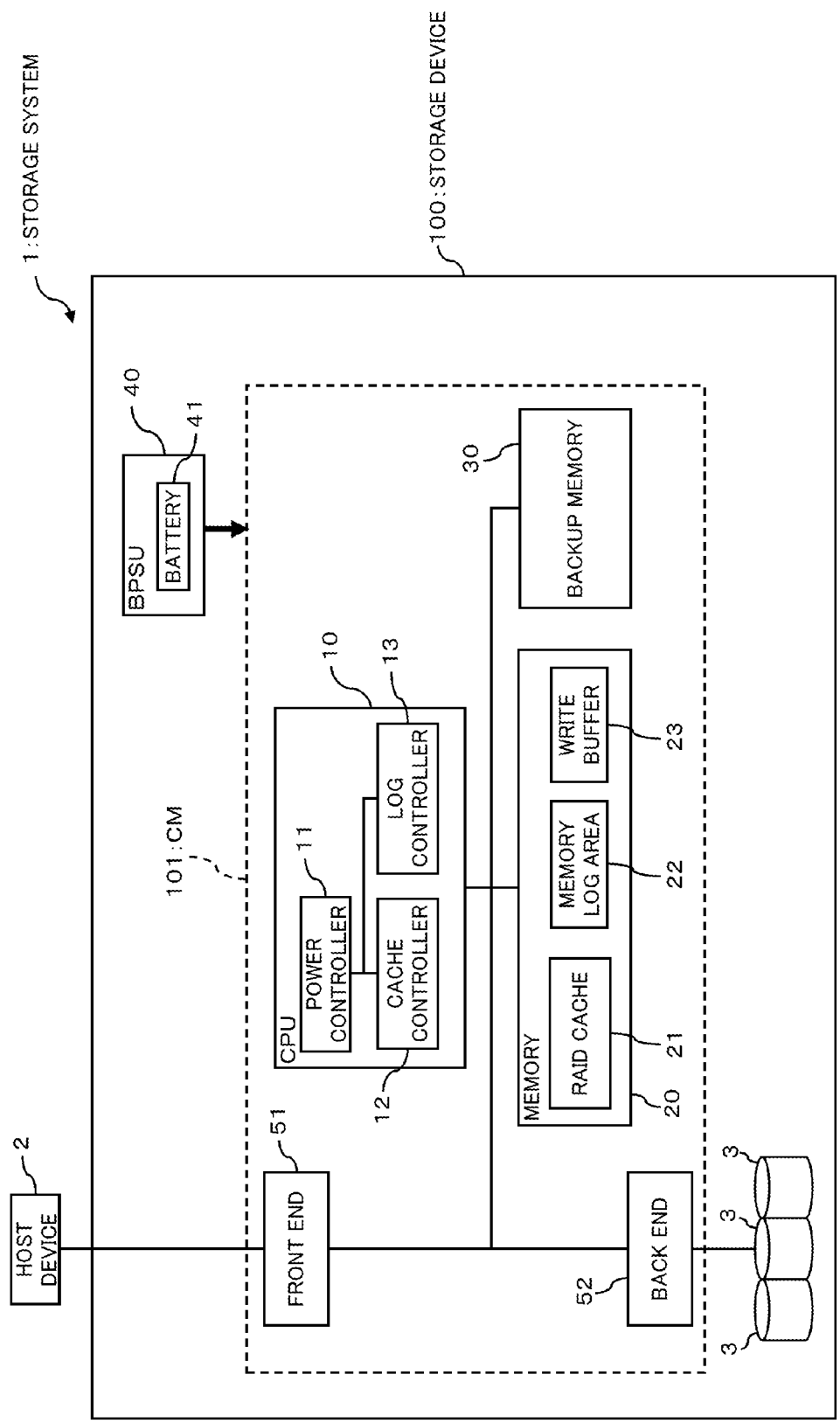
FIG. 1 is a diagram illustrating a functional configuration of a storage system as an example of an embodiment.

Hereinafter, embodiments of an information processing device, a storage processing method, and a program will be described with reference to the drawings. The embodiments illustrated below are examples only, and it is not intended to exclude application of various modifications and techniques that are not disclosed in the embodiments. That is, the present embodiments can be modified in various ways without departing from the spirit thereof. Moreover, the respective drawings are not intended to include the constituent components illustrated in the drawings only, but may include other functions and the like.

(A) Embodiment

FIG. 1 is a diagram illustrating a functional configuration of a storage system 1 as an example of an embodiment.

As illustrated in FIG. 1, the storage system 1 of the present embodiment includes a storage device (information processing device) 100 and one or more (one in the example illustrated in FIG. 1) host devices 2. The storage system 1 provides a storage area to the host device 2. The host device 2 is a computer (host computer) having a server function, for example, and is communicably connected to the storage device 100 via a network such as a local area network (LAN).

As illustrated in FIG. 1, the storage device 100 includes a controller module (CM) 101, a backup power supply unit (BPSU) 40, and one or more (three in the example illustrated in FIG. 1) storage devices 3.

The storage device 3 is a storage device that stores data of a hard disk drive (HDD), a solid state drive (SSD), or the like in such a manner that the data can be read and written. The storage device 3 functions as a storage unit that can store data received from the host device 2. In the present embodiment, an example where an HDD is used as the storage device 3 is illustrated. Hereinafter, the storage device 3 is sometimes illustrated as an HDD 3.

Note that, in FIG. 1, although three HDDs 3 are included in the storage device 100 for the sake of convenience, the present embodiment is not limited to this, and two or smaller or four or more HDDs 3 may be included. The storage device 100 may be redundant arrays of inexpensive disks (RAID) device that combines a plurality of these HDDs 3 and manages the same as one redundant array of storages. In the present embodiment, an example where the storage device 100 is a RAID device that forms a RAID using the plurality of these HDDs 3 will be described.

The BPSU 40 is a power supply device that supplies power to at least a portion of the CM 101 in the event of power-cut of the storage device 100. The BPSU 40 supplies power to a CPU 10, a memory 20, and a backup memory 30 of the CM 101, for example, in the event of power-cut of the storage device 100.

As illustrated in FIG. 1, the BPSU 40 includes a battery 41.

The battery 41 is a secondary battery such as, for example, a lead storage battery, a nickel-hydrogen battery (Ni—H), or a lithium-ion (Li-ION) battery. Note that, a capacitor such as an electric double-layer capacitor may be included in place of the battery 41.

The CM 101 is a controller (control device or computer) that controls the internal operation of the storage device 100 and performs various types of control in response to a command such as a read command or a write command from the host device 2, for example. The CM 101 is connected to a network via a front-end 51. The CM 101 controls data access to the HDD 3 according to a disc access command such as a read command or a write command received from the host device 2.

As illustrated in FIG. 1, the CM 101 includes the front-end 51, a back-end 52, the CPU 10, the memory 20, and the backup memory 30.

The front-end 51 is an interface controller (communication adapter) that is communicably connected to the host device 2 or the like, and is a channel adapter (CA), for example. The front-end 51 receives data transmitted from the host device 2 or the like and transmits data output from the CM 101 to the host device 2 or the like. That is, the front-end 51 controls input and output (I/O) of data to and from an external device such as the host device 2.

The back-end 52 is an interface controller (communication adapter) that is communicably connected to the HDD 3, and is a device adapter (DA), for example. The back-end 52 transmits data to be written to the HDD 3 to the HDD 3 and receives data read from the HDD 3. That is, the back-end 52 controls input and output (I/O) of data to and from the HDD 3.

The memory 20 is a storage device that includes a read only memory (ROM) and a random access memory (RAM). Software programs associated with various types of control of the storage device 100 and a series of data for the programs are written to the ROM of the memory 20. That is, programs and the like associated with cache data backup control executed in the event of power-cut of the storage device 100 are also written to the ROM.

Programs on the memory 20 are appropriately read into the CPU 10 and executed. Moreover, the RAM of the memory 20 is used as a primary storage memory or a working memory.

As illustrated in FIG. 1, the RAM of the memory 20 functions as a RAID cache (cache memory) 21, a memory log area 22, and a write buffer 23.

The RAID cache 21 stores data received from the host device 2 and data read from the HDD 3. The data (write data or write cache data) that is received from the host device 2 and written to the HDD 3 is stored in a predetermined area (user area) of the RAID cache 21 and is then transferred to the HDD 3.

In the storage system 1, a predetermined area for storing write data of the RAID cache 21 is used as a backup area, and a copy of the data stored in the backup area is stored in the backup memory 30 described later (this storing is referred to as memory backup).

Moreover, the data (read data) read from the HDD 3 is stored in an area for storing the read data of the RAID cache 21 and is then transferred to the host device 2.

Logs (management information) related to various processes performed by the CM 101 are stored in the memory log area 22. The logs include a log of fault information. Examples of the logs include various types of logs such as an error log, an event log, a degrade log, or a degrade factor log, and the logs are generated when the CPU 10 of the CM 101 executes an error detecting function, for example. The data size of one log is approximately between 30 bytes and 1 KByte (KB). Note that, the error detecting function of the CM 101 is realized by various existing methods, and description thereof will not be provided.

The write buffer (second storage medium) 23 is a buffer that temporarily stores logs in order to write out logs to the backup memory 30 described later. The write buffer 23 has the same size as one page of the backup memory 30 described later.

That is, one page of data that is written to the backup memory 30 is stored (deployed) in the write buffer 23 when the cache controller 12 or the log controller 13 described later stores data (backup data) in the backup memory 30.

Note that, at least part of the functions of the RAID cache 21, the memory log area 22, and the write buffer 23 of the memory 20 may be realized by another storage device that is provided separately from the memory 20, and various modifications may occur.

The backup memory (first storage medium) 30 is a memory (nonvolatile memory) such as a flash memory that can retain the stored data even when power is not supplied. An SSD is used as the backup memory 30, for example. However, the backup memory 30 is not limited to this, but a magneto-resistance RAM, a phase change RAM (PRAM), or a ferroelectric memory may be used, and various modifications may occur.

In the event of power-cut of the storage device 100, the data (logs) of the RAID cache 21 of the memory 20 and the backup area of the memory log area 22 is stored in the backup memory 30.

The CPU 10 is a processing device that performs various types of control and arithmetic operations and realizes various functions by executing the programs stored in the memory 20.

For example, the CPU 10 has the function of a system controller and realizes various functions of the storage device 100 such as a RAID implementing function, an alarm monitoring function, a path control function, or a RAS function. Moreover, as illustrated in FIG. 1, the CPU 10 has the functions of a power controller 11, a cache controller 12, and a log controller 13.

The power controller 11 controls supply of power to the storage device 100. The power controller 11 issues a power supply instruction to the BPSU 40 when power-cut is detected. Due to this, even when supply of power from a power supply device (not illustrated) is cut, power is supplied from the BPSU 40 to the respective units of the CM 101.

Note that, the power controller 11 may detect power-cut by comparing a voltage value of power supplied from a power supply device with a predetermined reference value, for example. Moreover, the power controller 11 may detect power-cut by receiving a notification of the occurrence of power-cut from other devices such as a power supply device.

Further, the power controller 11 notifies the cache controller 12 and the log controller 13 of the occurrence of power-cut when the occurrence of power-cut is detected.

The cache controller 12 controls data of the RAID cache 21. For example, when data corresponding to an input/output (I/O) request received from the host device 2 is present in the RAID cache 21, the cache controller 12 transfers the data to the front-end 51.

Moreover, upon receiving the notification of the occurrence of power-cut from the power controller 11, the cache data of the RAID cache 21 is copied to a predetermined area of the backup memory 30 (this copying is referred to as write-out of RAID cache data).

Upon receiving the notification of the occurrence of power-cut from the power controller 11, the log controller 13 writes out the logs of the memory log area 22 in a predetermined area of the backup memory 30 (this writing-out is referred to as write-out or discharge of memory logs). Note that, the write-out of memory logs by the log controller 13 is preferably performed after the cache controller 12 writes out the RAID cache data.

The log controller 13 manages logs in units of blocks of a predetermined size. That is, the log controller 13 divides a memory area of the backup memory 30 into areas of a predetermined size (for example, 64 KBytes) called pages and manages logs by storing the same in these pages. Hereinafter, the data size of one page is referred to as a page size.

Note that, as described above, the data size of one log is approximately between 30 Bytes and 1 KByte (KB), and one or more logs are stored in one page. Moreover, a log that is larger than one page size is divided into a plurality of logs that are smaller than one page size.

Moreover, as described above, the write buffer 23 has a size of one page (64 KB). The log controller 13 copies logs that can be written to one page of the backup memory 30 to the write buffer 23 and then writes the remaining logs to a predetermined area of the backup memory 30.

That is, the log controller 13 reads logs to be written to the backup memory 30 from the memory log area 22 and stores the same in the write buffer 23 and creates an image (one page of data) of a page that is to be stored in the backup memory 30. Moreover, the log controller 13 writes one page of data prepared in the write buffer 23 to a predetermined area of the backup memory 30 as it was.

FIGS. 2A and 2B are diagrams for describing a method of managing logs in the storage system 1 as an example of the embodiment, in which FIG. 2A illustrates a state before logs are stored, and FIG. 2B illustrates a state after logs are stored.

As illustrated in FIGS. 2A and 2B, the log controller 13 manages logs using a page portion (log area) for storing log data and a header portion (management area) for retaining management information (header) of the page portion. These page portion and header portion are stored in the backup memory 30.

The page portion includes a plurality of pages and one or more logs are stored in each of these pages. Moreover, as illustrated in FIGS. 2A and 2B, pages are managed by being classified into types that correspond to the types of logs. FIGS. 2A and 2B illustrate an example where pages (logs) are classified into 239 types of Type#0 to Type#238.

The log controller 13 assigns pages to respective types that serve as the types of logs and maintains the order by linking the assigned pages to the respective types.

Logs of the same type are stored in one page, and a plurality of pages in which logs of the same type are stored are linked to the same type. When respective pages are linked, pages are processed in a FIFO (First In, First Out) manner.

In the example illustrated in FIGS. 2A and 2B, pages are piled in respective types, which represents a state where a plurality of pages are linked to each type. Further, in the drawings, pages located on the lower side among a plurality of pages piled in each type are older than pages located on the upper side, and the page on the lowermost side is the leading page (Top Page).

That is, in the log portion, a plurality of pages linked to a type are sequentially processed starting from the leading page on the lowermost side.

A page in which a log is not stored is treated as a free page, and the free page is linked to a free page type (Type#239 in the example illustrated in FIGS. 2A and 2B).

Information (management information) on pages that are associated with each type in the log portion is stored in the header portion.

In the example illustrated in FIGS. 2A and 2B, Type Number, Page Count, Top Page Number, and Bottom Page Number are managed in the header portion.

Type Number is information (number) for identifying a type, and Page Count represents the number of pages linked to the type. Top Page Number represents a leading page of the pages linked to the type, and Bottom Page Number represents a last page of the pages linked to the type.

Moreover, when a log is stored in a page, in a case where the log cannot be stored in a page that has already been linked to a type corresponding to the log, the free page is used.

For example, in the state illustrated in FIG. 2A, when a new log corresponding to Type#237 is to be stored, the log controller 13 checks the last page linked to Type#237 by referring to Bottom Page Number of the header portion. In FIG. 2A, the last page of Type#237 is Page#9.

When it is difficult to store a new log in Page#9, the log controller 13 checks the leading page linked to the free page (Type#239) by referring to Bottom Page Number of the header portion. In FIG. 2A, the leading page of Type#239 is Page#10.

When a usable page is linked to the free page (Type#239), the log controller 13 assigns the leading page (Page#10) to the last page of Type#237 and stores the log in Page#10 as illustrated in FIG. 2B.

Moreover, there may be a case where all pages of the log portion are used, and a usable page is not linked to the free page (Type#239). Such a state where all pages are used and a usable page is not linked to the free page (Type#239) is sometimes referred to as a state where the free page is exhausted.

The log controller 13 can write out logs in two modes of first and second modes and performs the write-out of logs in any one of these two modes.

In the first mode, the log controller 13 repeatedly performs an access process of writing out logs and headers to the backup memory 30 until all memory logs of the respective types are written out.

Specifically, in a case (Case A) where a vacant area for writing logs is not present in a page that has already been assigned to a type, a write process of the following steps 1 to 3 is performed. That is, a new free page is assigned to a type of a log to be stored to update a header (step 1). The log is written out to the free page assigned to the write buffer 23 and the page is written out to the backup memory 30 (step 2). Further, the updated header is written to the backup memory 30 (step 3).

In this manner, in Case A of the first mode, three write processes of steps 1 to 3 are performed. Moreover, when there are a plurality of logs that are to be written out to the backup memory 30, the processes of steps 1 to 3 are repeatedly performed for each log.

In this manner, in the first mode, by updating the header whenever one page of logs are written out to the backup memory 30, it is possible to reliably write out logs to the backup memory 30.

Note that, in a case (Case B) where a vacant area for writing logs is present in a page that has already been assigned to a type, a process of the following steps 1', 2', and 3 is performed. That is, a page assigned to a type is read into the write buffer 23 (step 1'). Logs are written out to the page read into the write buffer 23 and the page is written out to the backup memory 30 (step 2'). The updated header is written to the backup memory 30 (step 3).

In this manner, in Case B, one read process and two write processes are performed in steps 1', 2', and 3. Moreover, when there are a plurality of logs that are to be written out to the backup memory 30, the processes of steps 1', 2', and 3 are repeatedly performed for each log.

Case B is a case where a vacant area is present in a page during the previous log write-out process. Here, most cases are Case B where the log write-out process of the first page involves writing logs to a previous vacant area. Moreover, a log write-out process of the second or subsequent page corresponds to Case A because the process is performed after one page becomes full and it is necessary to assign a new page.

In general, when logs of the memory log area 22 are written out to the backup memory 30, the write-out process is performed after a certain number of logs are accumulated in the memory log area 22. Thus, the log write-out process handles a plurality of pages (for example, several tens of pages) of log data. Due to this, most log write-out processes correspond to a case (Case A) where a vacant area for writing logs is not present in the page. That is, in the first mode, three write processes are often performed when one page of logs are written out.

Next, the second mode will be described.

FIGS. 3A, 3B, and 3C are diagrams for describing a method of managing logs in the second mode in the storage system 1 as an example of the embodiment. FIG. 3A illustrates Phase 1, FIG. 3B illustrates Phase 2, and FIG. 3C illustrates Phase 3. FIG. 4 is a diagram illustrating used sizes of logs stored in the memory log area 22 of the storage system 1 as an example of the embodiment.

In the second mode, the log controller 13 performs a log write-out process in three phases of Phases 1 to 3 illustrated in FIGS. 3A, 3B, and 3C.

In Phase 1, first, the log controller 13 calculates the number of free pages (the number of required free pages) required for storing logs.

As illustrated in FIG. 4, the log controller 13 manages a total size (Used Size) for each type, of the logs stored in the memory log area 22 of the memory 20.

In the example illustrated in FIG. 4, in the memory log area 22, a total size (Used Size) of logs of Type 2 (Type#2) is 987654 bytes. Note that, in FIG. 4, the data sizes of logs of types other than Type 2 are illustrated as xxxx, yyyy, zzzz, and the like for the sake of convenience.

The log controller 13 calculates the number of required free pages using the used sizes of the logs in the memory log area 22 managed in this manner and the page size (for example, 64 KB) of the backup memory 30.

Specifically, the log controller 13 calculates the number of required free pages by dividing the used size of logs of each type by the page size. For example, in the example illustrated in FIG. 4, the number of free pages required for storing logs (987654 bytes) of Type 2 in the backup memory 30 is 16 (16 pages) as below.

$$\text{Number of Required Free Pages} = 987654 \div (64 \times 1024)$$
$$= 15.07$$

The log controller 13 selects the calculated number of required pages from pages that have already been assigned to the type and assigns the selected pages as free pages.

Here, as a method of selecting pages to be assigned as free pages among the pages that have already been assigned to the type, it is preferable to sequentially select pages starting from the (oldest) page that has already been linked to the type in the log portion, for example.

In the example illustrated in FIG. 3A, five pages in total including three pages (Page#1, Page#13, and Page#14) of Type 1 (Type#1) and two pages (Page#3 and Page#4) of Type 237 (Type#237) are selected.

The log controller 13 assigns these selected pages as free pages (Type#239).

By temporarily assigning pages for storing log data as free pages, it is possible to prevent occurrence of inconsistency in a header. This is because data in pages is invalid in a state where the pages are assigned as free pages and the data is not fixed until updating of the header in Phase 3 described later is completed.

Subsequently, as illustrated in FIG. 3B, the log controller 13 stores log data in the respective assigned free pages in Phase 2.

The log controller 13 stores log data in the backup memory 30 via the write buffer 23. Specifically, the log controller 13 creates one page of data to be recorded in the backup memory 30 in the write buffer 23 and stores the data created in the write buffer 23 in the backup memory 30.

Figure 5:
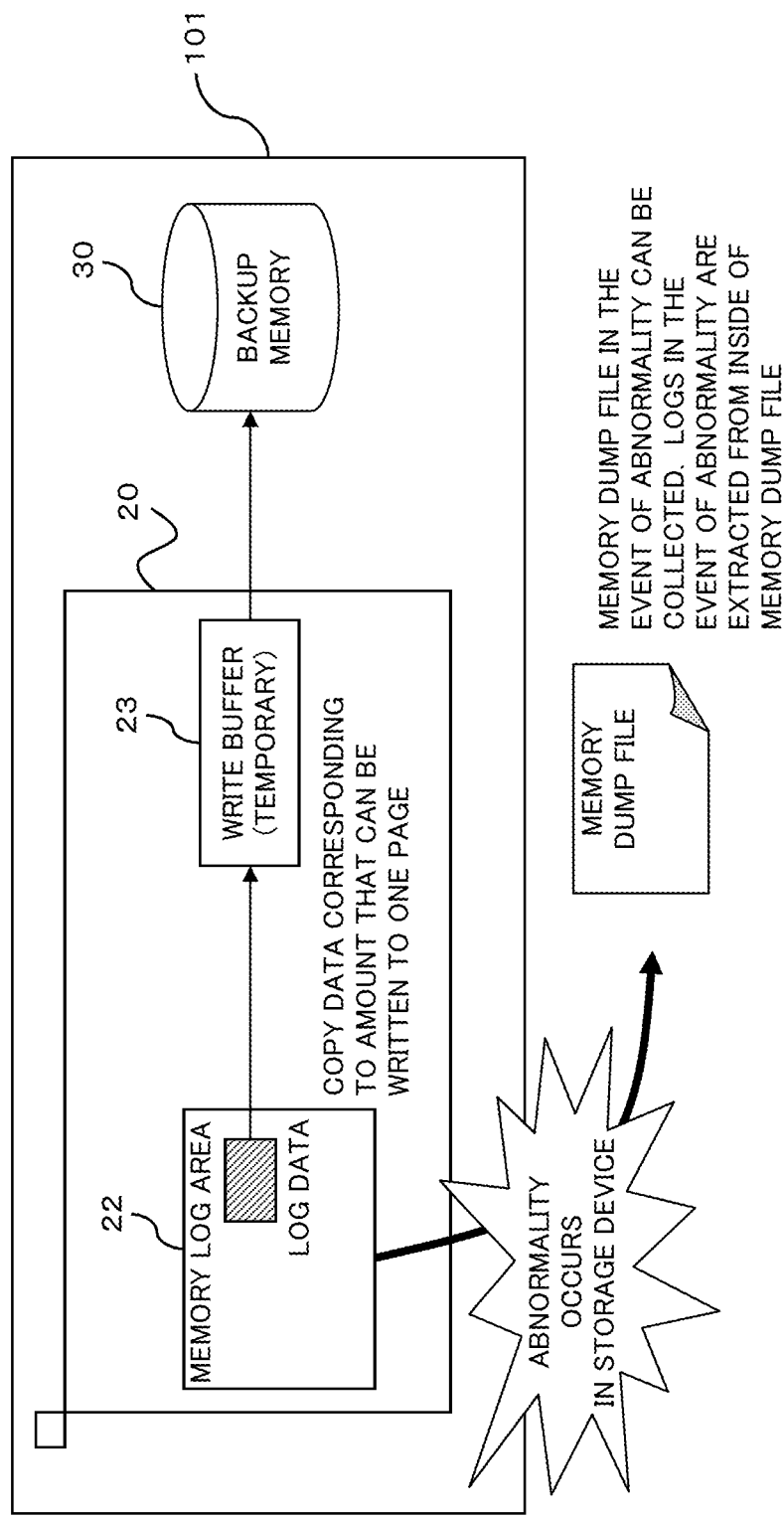
FIG. 5 is a diagram for describing a log write-out process in the storage system as an example of the embodiment.

FIG. 5 is a diagram for describing a log write-out process in the storage system 1 as an example of the embodiment.

As illustrated in FIG. 5, the log data of the memory log area 22 is copied to the write buffer 23 by an amount that can be written to one page, and the log data is written from the write buffer 23 to free pages of the backup memory 30.

Here, when an abnormality such as firmware panic occurs during writing of log data to free pages, although no logs remain in the backup memory 30, a memory dump file can be collected from the memory log area 22 or the write buffer 23. Since logs remain in the memory dump file, it is possible to collect logs in the event of abnormality and to perform fault analysis.

After that, as illustrated in FIG. 3C, in Phase 3, the log controller 13 rewrites a header according to updating of the page portion of the backup memory 30.

In the present embodiment, the log controller 13 performs a log write-out process in the second mode in a case (during power-cut) where supply of power to the storage system 1 is cut and performs a log write-out process in the first mode in the other normal cases. That is, during power-cut, higher importance is placed on a log discharge speed.

Figure 6:
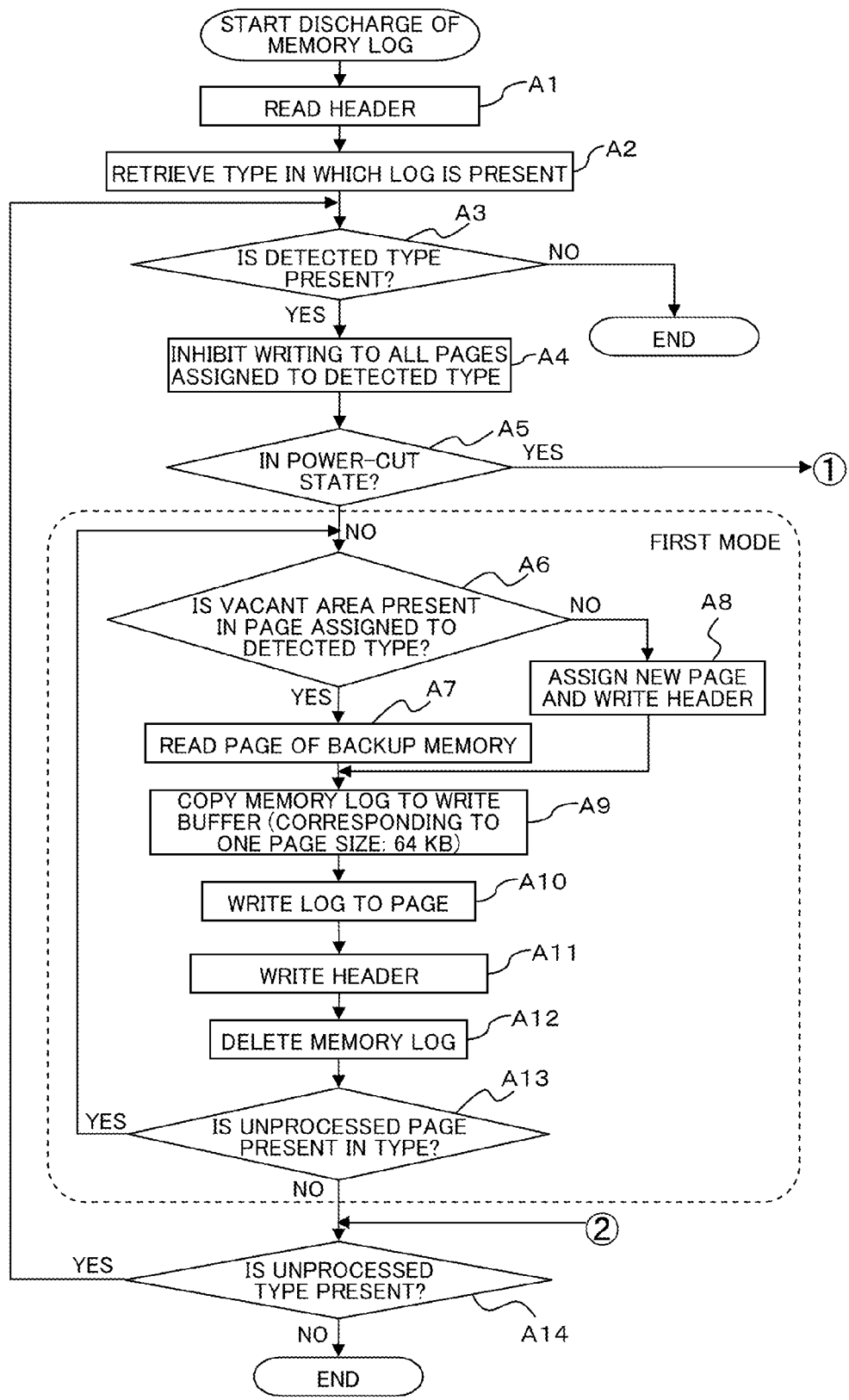
FIG. 6 is a flowchart for describing a method of writing out a memory log in the storage system as an example of the embodiment.
Figure 7:
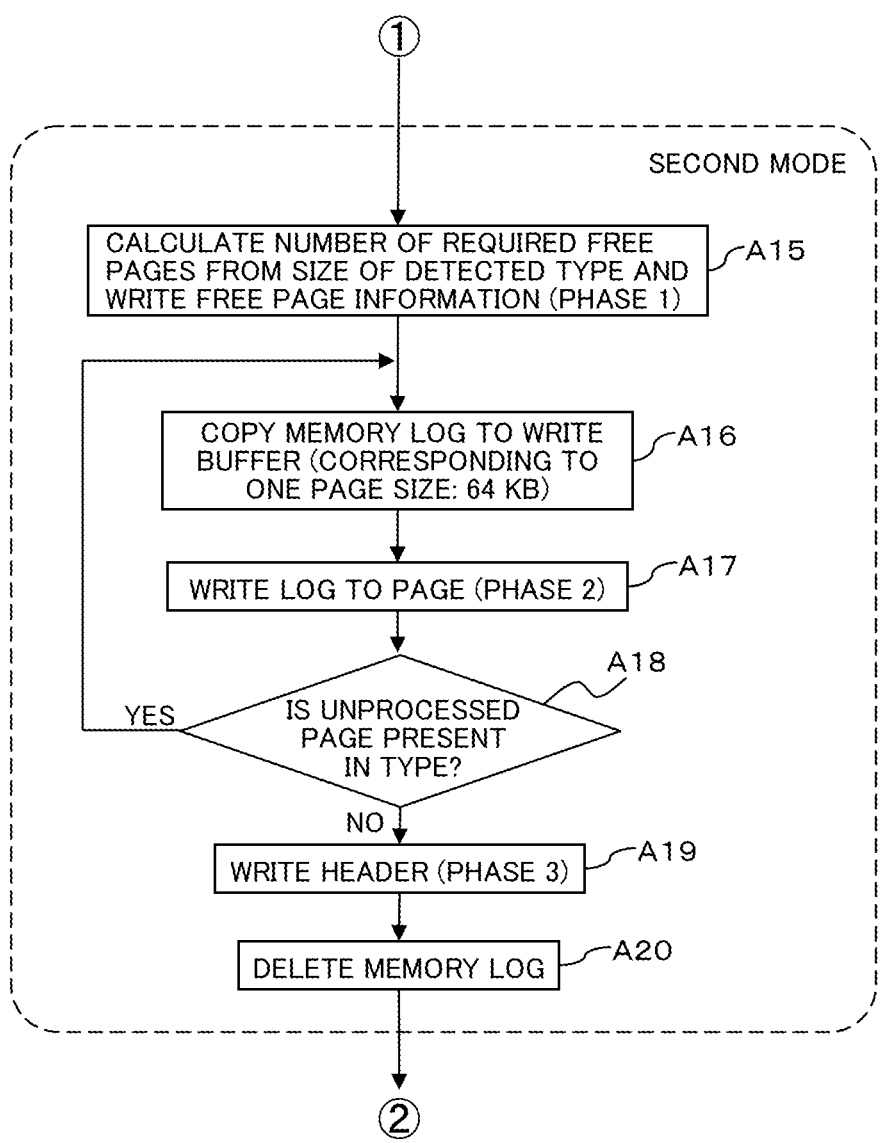
FIG. 7 is a flowchart for describing a method of writing out a memory log in the storage system as an example of the embodiment.

A method of writing out memory logs in the storage system 1 as an example of the embodiment including the above-described configuration will be described with reference to the flowcharts (steps A1 to A20) illustrated in FIGS. 6 and 7. Note that, FIG. 6 illustrates steps A1 to A14 and FIG. 7 illustrates steps A15 to A20.

This process starts, for example, when the size of logs stored in the memory log area 22 reaches a predetermined amount or more.

In step A1, the log controller 13 reads a header from the backup memory 30. In step A2, a type in which logs are present is retrieved from the logs of the memory log area 22.

In step A3, the log controller 13 determines whether there is a type in which logs are present. When a type in which logs are present is not present (see NO route of step A3), it is determined that logs to be backed up are not present, and the process ends.

When a type in which logs are present is present (see YES route of step A3), the log controller 13 selects one type in which logs are present and inhibits writing to all pages assigned (linked) to the selected type (detected type) by referring to the header (step A4). Specifically, writing to pages that have already been assigned to the type is inhibited. Note that, here, it is still possible to assign new pages to the type (that is, to add logs to the type), and the newly assigned pages are processed in the next log write-out process.

In step A5, the log controller 13 checks whether the system is in a power-cut state. When the system is not in the power-cut state (see NO route of step A5), the log controller 13 performs a log write-out process in the first mode.

In the first mode, first, in step A6, the log controller 13 determines whether a vacant area is present in a page assigned to the detected type. That is, the log controller 13 checks whether a vacant area capable of writing the log in the page that is linked at the last time among the pages linked to the detected type is present.

When a vacant area is present in the page assigned to the detected type (see YES route of step A6: Case B), the log controller 13 reads the pages from the backup memory 30 into the write buffer 23 in step A7. On the other hand, when the vacant area is not present in the page assigned to the detected type (see NO route of step A6: Case A), the log controller 13 assigns free pages to the type in step A8. Further, the log controller 13 writes the header updated based on the assignment of free pages to the backup memory 30.

After that, in step A9, the log controller 13 reads logs (target logs) to be backed up from the memory log area 22 and stores the same in the pages of the write buffer 23. That is, the memory logs are copied to the write buffer 23.

In step A10, the log controller 13 writes the data of the pages of the write buffer 23 to the backup memory 30.

In step A11, the log controller 13 writes the header to the backup memory 30. After that, in step A12, the log controller 13 deletes the target logs from the memory log area 22.

In step A13, the log controller 13 checks whether an unprocessed page is present in the same type. When an unprocessed page is present (see YES route of step A13), the flow returns to step A6. Moreover, when an unprocessed page is not present in the same type (see NO route of step A13), it is checked in step A14 whether an unprocessed type is present.

When an unprocessed type is present (see YES route of step A14), the flow returns to step A3 and it is determined whether there is a type in which logs are present. That is, when it is determined in step A3 that there is still a type in which logs are present, the process switches to the type and the processes of step A4 and the subsequent steps are performed again. Moreover, when there is not an unprocessed type (see NO route of step A14), the process ends.

On the other hand, when it is determined in step A5 that the system in the power-cut state (see YES route of step A5), the log controller 13 performs a log write-out process in the second mode.

In the second mode, first, in step A15, the log controller 13 calculates the number of free pages required for storing logs (Phase 1). That is, the log controller 13 calculates the number of required free pages based on the data size of logs of the detected type.

The log controller 13 selects the calculated number of required pages from pages that have already been assigned to the type, assigns the selected pages as free pages, and writes the header updated based on the assignment of the free pages to the write buffer 23.

After that, in step A16, the log controller 13 copies the logs (target logs) of the memory log area 22 to the write buffer 23 to create one page (for example, 64 KBytes) of data. After that, in step A17, the log controller 13 writes the logs of the write buffer 23 to the pages of the backup memory 30 (Phase 2).

In step A18, the log controller 13 checks whether an unprocessed page is present in the same type. When an unprocessed page is present (see YES route of step A18), the flow returns to step A16. Moreover, when an unprocessed page is not present in the same type (see NO route of step A18), the log controller 13 writes the header to the backup memory 30 in step A19 (Phase 3). After that, in step A20, the log controller 13 deletes the target logs from the memory log area 22 and the flow proceeds to step A14.

In this manner, according to the storage system 1 as an example of the embodiment, in the second mode, the log controller 13 calculates the number of free pages required for storing logs and assigns the free pages when performing a log write-out process. Moreover, the log controller 13 writes the logs to the plurality of these free pages and then rewrites the header.

That is, by updating the header at once after writing out the log data to the respective assigned free pages, it is possible to decrease the number of write processes performed on the backup memory 30.

In Case A of the first mode, three write processes of steps 1 to 3 are performed whenever one page of data is written out. Thus, when the number of pages written out for each type is X, the number of write processes to the backup memory 30 is calculated as 3X.

For example, when five pages of logs of a certain type are written out to the backup memory 30 (X=5), 15 write processes (15=5×3) are performed.

In contrast, in the second mode, when the number of pages written out for each type is X, the number of write processes to the backup memory 30 is calculated as X+2.

Thus, when five pages of logs of a certain type are written out to the backup memory 30 (X=5), 7 write processes (7=5+2) are performed.

That is, the time (X+2) required for writing out the log data of each type in the second mode is smaller by (X+2)/3X as compared to the time (3X) required for writing out the log data of each type in the first mode. Thus, the log write-out process in the second mode can be performed in a period that is approximately ⅓ of the period required for the process in the first mode.

For example, in a case where the memory log area 22 including the size of 5 MB becomes full, logs are concentrated on approximately three types so that the X value increases. Thus, by performing the log write-out process in the second mode, the process can be completed in a time that is ⅓ to ½ of that of the first mode.

For example, by performing the log write-out process in the second mode in the event of power-cut of the storage system 1, it is possible to reliably save the data of the memory log area 22 in the backup memory 30 and to improve the reliability.

Further, in the second mode, by reducing the number of write processes to the backup memory 30, it is possible to extend the service life of the backup memory 30 and to improve the reliability.

On the other hand, by performing the log write-out process in the first mode to update the header whenever writing out one page of logs to the backup memory 30, it is possible to reliably write out logs to the backup memory 30.

Further, in the first mode, since the logs on the memory log area 22 are deleted whenever one page of logs are written, it is possible to secure vacant areas of the memory log area 22 and to record new logs in the secured vacant areas.

(B) Modifications

Note that, the present invention is not limited to the above embodiment but can be modified in various ways without departing from the spirit of the present embodiment.

For example, in the embodiment, although the log write-out process is performed in any one of the first and second modes depending on whether the system is in the power-cut state, the present embodiment is not limited to this.

As described above, in the event of power-cut of the storage system 1, it is necessary to write out the cache data (RAID cache data) of the RAID cache 21 and to write out the logs of the memory log area 22 within the discharge time of the mounted battery 41.

Moreover, the write-out of the RAID cache data is performed preferentially to the write-out of the logs in the event of power-cut.

In this modification, a time (remaining battery discharge time: Time A) that is taken for a log write-out process after writing out RAID cache data within a battery discharge time is compared with a predicted time (memory log write-out time: Time B) required for a log write-out process in the first mode.

When the remaining battery discharge time is longer than the memory log write-out time, the log write-out process is performed in the first mode. When the remaining battery discharge time is equal to or smaller than the memory log write-out time, the log write-out process is performed in the second mode.

Thus, the log controller 13 calculates the remaining battery discharge time and the memory log write-out time. Hereinafter, a method of calculating the remaining battery discharge time and the memory log write-out time will be described.

(1) Remaining Battery Discharge Time

A remaining battery discharge time assigned to the memory log write-out process is obtained by subtracting a time (cache write-out time) required for writing out RAID cache data from the entire battery discharge time of the battery 41.

The entire battery discharge time is calculated according to Equation (1) below, for example.

$$\text{Entire battery discharge time} = (\text{Maximum operable time with battery discharge}) \times (\text{Battery charge rate}) \times (\text{Battery aging rate}) \quad (1)$$

Here, the "maximum operable time with battery discharge" is determined according to the specification of the storage system 1 and is 600 seconds, for example.

The "battery charge rate" is a charge state of the battery 41 and is expressed in a percentage, for example. The maximum operable time with battery discharge is guaranteed in the state where the charge rate is 100%.

The "battery aging rate" is a value that indicates a battery deterioration state, and is expressed in a percentage, for example. The battery 41 deteriorates with time, and the operable time also decreases with the deterioration.

The cache write-out time is calculated according to Equation (2) below, for example.

$$\text{Cache data write-out time} = (\text{Maximum time required for write-out process when cache data is full}) \times (\text{Cache use rate}) \quad (2)$$

Here, the "maximum time required for write-out process when cache data is full" is a time required for writing cache data stored in the RAID cache 21 in the full state to the backup memory 30. The maximum time required for write-out process when cache data is full is determined according to the size and I/O performance of the RAID cache 21, the I/O performance of the backup memory 30, or the like, for example. The maximum time required for write-out process when cache data is full is 300 seconds, for example.

The "cache use rate" is a data size of cache data stored in the RAID cache 21 and indicates the proportion (for example, in a percentage) of the cache data occupying the areas of the RAID cache 21. When the cache use rate is 100%, the write-out process when the cache data is full requires the maximum time (for example, 300 seconds).

Moreover, the remaining battery discharge time (Time A) is calculated according to Equation (3) below.

$$\text{Time } A = (\text{Entire battery discharge time}) - (\text{Cache data write-out time}) \quad (3)$$

Note that, in the storage system 1, a power-cut process is not performed in the event of fault of the BPSU 40 or when the charge rate of the battery 41 is obviously low (smaller than a predetermined threshold value).

(2) Memory Log Write-Out Time

The memory log write-out time (Time B) is calculated according to Equation (4) below, for example.

$$\text{Time } B = (\text{Memory log write-out time in first mode}) \times \{(\text{Number of used pages})/(\text{Maximum number of pages})\} \quad (4)$$

Here, the "number of used pages" is a value that expresses a data size of backup target logs stored in the memory log area 22 in the number of pages. That is, the "number of used pages" corresponds to the size of backup target log data.

The "time required for log write-out process in first mode" is calculated according to Equation (5) below, for example.

$$\text{Memory log write-out time in first mode} = 3 \times (\text{number of pages}) \times (\text{write time}) \quad (5)$$

The "write time" is a time per write process to the backup memory 30, and is approximately 5 to 6 Ticks (1 Tick=1/60 seconds), for example.

The "maximum number of pages" is a maximum value when the log data of the memory log area 22 is expressed as the number of pages and is the number of pages when the entire data of the memory log area 22 is logs. That is, the maximum number of pages is a value that expresses the entire data size of the memory log area 22 in the number of pages. For example, when the size of the memory log area 22 is 5 MB, Maximum number of pages=5 MB/64 KB=80 pages Therefore, $$\begin{aligned}\text{Memory log write-}\\\text{out time in first mode}\end{aligned} &= 3 \times (\text{Maximum number of pages}) \times \\ &\quad (\text{Write time}) \\ &= \frac{3 \times (80 \text{ Pages}) \times}{\{(5 \text{ to } 6/60)\text{seconds}\}} \\ &= 20 \text{ to } 24 \text{ seconds}$$

Here, when the memory log write-out time in the first mode is 25 seconds by taking the write time of 20 to 24 seconds and other overheads into account, the memory log write-out time (Time B) is expressed according to Equation (6) below.

$$\text{Time } B = (25 \text{ seconds}) \times \{(\text{Number of used pages})/80 \text{ pages}\} \quad (6)$$

The log controller (comparator) 13 compares Time A and Time B obtained in this manner to determine whether the memory logs can be written out by the conventional process. The determination result is set as a process flag and is stored in a predetermined area of the memory 20, for example.

Specifically, when the memory log write-out time (Time B) is equal to or longer than the remaining battery discharge time (Time A), the log controller 13 performs the log write-out process in the second mode.

Figure 8:
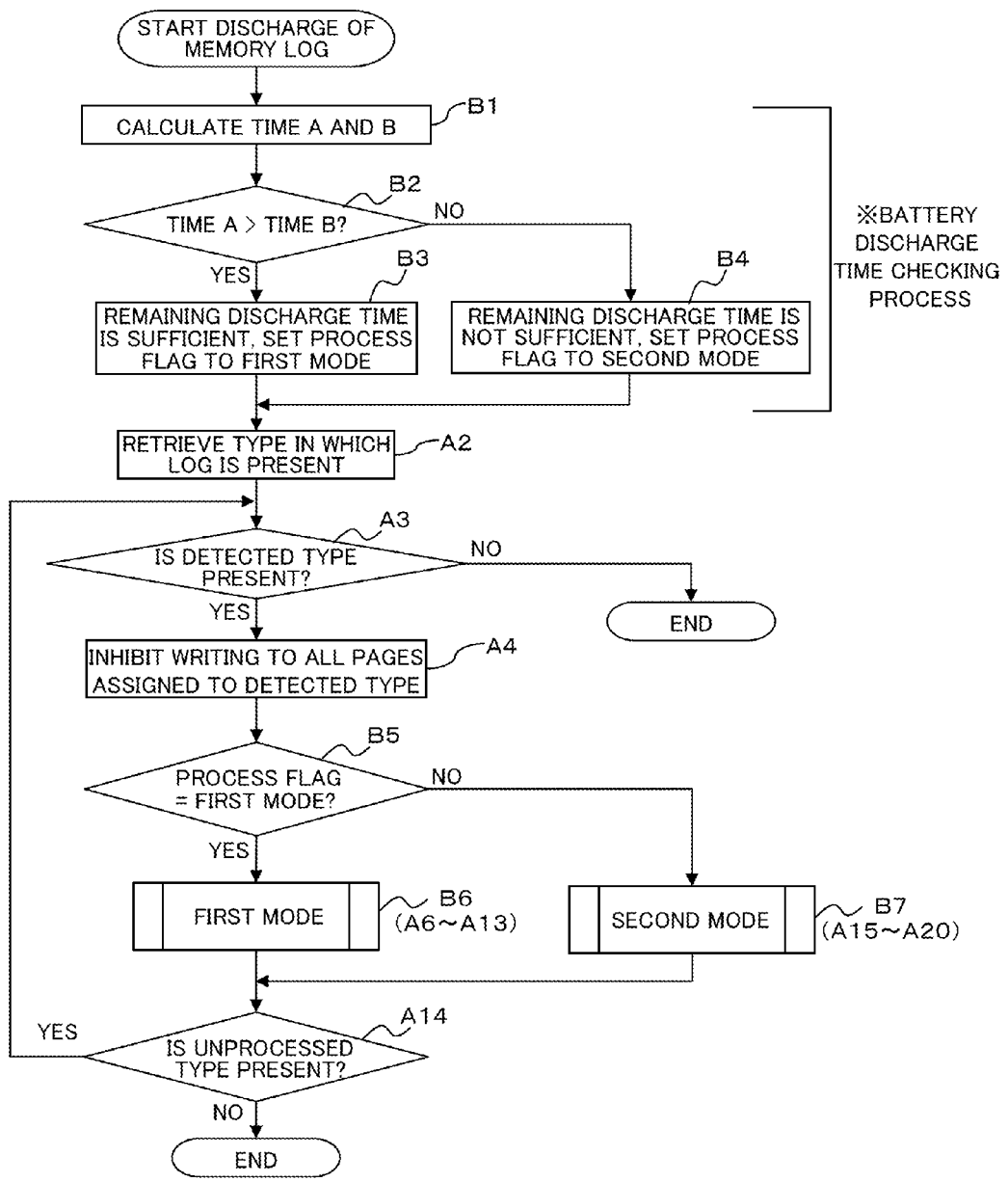
FIG. 8 is a flowchart for describing a method of writing out a memory log in a modification of the storage system as an example of the embodiment.

A memory log write-out method in a modification of the storage system 1 as an example of the embodiment including the above configuration will be described with reference to the flowcharts (steps B1 to B7, A2 to A4, and A14) illustrated in FIG. 8. Note that, in the drawing, steps indicated by the same numeral as the above-described steps represent the same processes, and detailed description will not be provided.

In step B1, first, the log controller 13 calculates the remaining battery discharge time (Time A) and the memory log write-out time (Time B) based on Equations (3) and (4).

In step B2, the log controller 13 compares Time A and Time B to determine whether Time A is longer than Time B. When Time A is longer than Time B (see YES route of step B2), it is determined in step B3 that the remaining battery discharge time is sufficient for writing out memory logs to the backup memory 30. The log controller 13 sets the process flag to the first mode.

On the other hand, when Time A is equal to or smaller than Time B (see NO route of step B2), it is determined in step B4 that the remaining battery discharge time is not sufficient. That is, it is determined that the remaining battery discharge time is not sufficient for writing out the memory logs to the backup memory 30 in the first mode. The log controller 13 sets the process flag to the second mode.

After that, the processes of steps A2 to A4 are performed, and then in step B5, the log controller 13 determines whether a value indicating the first mode is set to the process flag. When the process flag indicates the first mode (see YES route of step B5), a log data write-out process is performed in the first mode in step B6. That is, the processes of steps A6 to A13 of FIG. 6 are performed.

When the process flag indicates the second mode (see NO route of step B5), the log data write-out process is performed in the second mode in step B7. That is, the processes of steps A15 to A20 of FIG. 7 are performed.

After that, in step A14, the log controller 13 checks whether there is an unprocessed type.

When there is an unprocessed type (see YES route of step A14), the flow returns to step A3, and it is determined whether there is a type in which logs are present. That is, when it is determined in step A3 that there is still a type in which logs are present, the process switches to the type and the processes of step A4 and the subsequent steps are performed. Moreover, when there is not an unprocessed type (see NO route of step A14), the process ends.

In this manner, according to the modification of the storage system 1 as an example of the embodiment, it is possible to obtain the same operational effects as the above embodiment. In addition, the log controller 13 performs the log write-out process in the first mode when the remaining battery discharge time is longer than the memory log write-out time and performs the log write-out process in the second mode when the remaining battery discharge time is equal to or smaller than the memory log write-out time.

When the remaining battery discharge time is longer than the memory log write-out time, it can be determined that the remaining battery discharge time is sufficient for writing out memory logs to the backup memory 30. Thus, the log controller 13 can improve the reliability by performing the log write-out process in the first mode where logs can be reliably written out to the backup memory 30.

On the other hand, when the remaining battery discharge time is equal to or smaller than the memory log write-out time, it can be determined that the remaining battery discharge time is not sufficient for writing out the memory logs to the backup memory 30 in the first mode. Thus, the log controller 13 can improve reliability by performing the log write-out process in the second mode where the log write-out process can be performed in a short time.

(C) Others

A program for realizing the functions of the power controller 11, the cache controller 12, and the log controller 13 is provided in such a form that the program is recorded on a computer readable recording medium such as, for example, flexible disks, CDs (CD-ROM, CD-R, CD-RW, or the like), DVDs (DVD-ROM, DVD-RAM, DVD-R, DVD+R, DVD-RW, DVD+RW, HD DVD, or the like), a Blu-ray disc, a magnetic disk, an optical disc, or an magneto-optical disk. A computer reads the program from the recording medium, and transfers and stores the program to and in an internal storage device or an external storage device. Moreover, the programs may be recorded on a storage device (recording medium) such as, for example, a magnetic disk, an optical disc, or a magneto-optical disc and may be provided from the storage device to the computer via a communication path.

When the functions of the power controller 11, the cache controller 12, and the log controller 13 are realized, the program stored in the internal storage device (the memory 20 or the like in the present embodiment) is executed by a microprocessor (the CPU 10 in the present embodiment) of the computer. In this case, the program recorded on the recording medium may be read and executed by the computer.

Note that, in the present embodiment, the computer is a concept that includes hardware and an operating system, and means hardware that operates under the control of the operating system. When the operating system is unnecessary and hardware is operated by an application program only, the hardware itself corresponds to the computer. The hardware includes at least a microprocessor such as a CPU and a unit for reading a computer program recorded on a recording medium. In the present embodiment, the CM 101 has the function of the computer.

Note that the present disclosure is not restricted to the embodiment described above, and various modifications may be made without departing from the spirit of the present disclosure.

For example, in the example illustrated in FIG. 1, although one CM 101 is illustrated, the present embodiment is not limited to this, two or more CMs 101 may be redundantly provided in the storage device 100.

The embodiments may be practiced or manufactured by those ordinary skilled in the art with reference to the above disclosure.

According to an embodiment, it is possible to write out management information on a memory in a short time.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a illustrating of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing device comprising:
a first storage medium;
a calculator that calculates the number of pages used for storing Management information in the first storage medium;
a storage processor that sets pages corresponding to the calculated number of pages as free pages and stores the management information in the set free pages to thereby store the management information in the first storage medium; and
an update processor that performs a process of updating position Management information that indicates a storage position of the management information in the first storage medium.

2. The information processing device according to claim 1, further comprising: a second storage medium,
wherein the storage processor stores the management information in the second storage medium and stores the management information stored in the second storage medium in the free pages.

3. The information processing device according to claim 1, wherein the calculator divides a data size of the management information by the size of the pages to calculate the number of pages.

4. The information processing device according to claim 1, further comprising: a backup power supply that supplies power in a power-cut state of A main power supply,
wherein the calculator, the storage processor, and the update processor Perform functions while the backup power supply supplies power.

5. The information processing device according to claim 4, wherein
one page that has already been assigned to the management information is assigned to new management information to update the position management information according to the assignment,
the new management information is stored in the one page to store the management information in the first storage medium, and
when a predicted time required for a process of storing the management information in the first storage medium when the position management information was updated according to the storing is equal to or longer than a time allocatable to storing of the management information in the first storage medium within a remaining discharge time of the backup power supply, the calculator, the storage processor, and the update processor perform the process of storing the management information in the first storage medium.

6. A storage processing method of storing management information in a first storage medium, the method comprising:
calculating the number of pages used for storing the management information in a first storage medium;
setting pages corresponding to the calculated number of pages as free pages and storing the management information in the set free pages to thereby store the management information in the first storage medium; and
updating position management information that indicates a storage position of the management information in the first storage medium.

7. The storage processing method according to claim 6, further comprising:
storing the management information in a second storage medium and storing the management information stored in the second storage medium in the free pages.

8. The storage processing method according to claim 6, further comprising:
dividing a data size of the management information by the size of the pages to calculate the number of pages.

9. The storage processing method according to claim 6, wherein the calculating of the number of pages, the storing of the management information in the first storage medium, and the updating of the position management information are performed while a backup power supply that supplies power in a power-cut state of a main power supply supplies power.

10. The storage processing method according to claim 9, further comprising:
assigning one page that has already been assigned to the management information to new management information to update the position management information according to the assignment; and
storing the new management information in the one page to store the management information in the first storage medium, wherein
when a predicted time required for a process of storing the management information in the first storage medium when the position management information was updated according to the storing is equal to or longer than a time allocatable to storing of the management information in the first storage medium within a remaining discharge time of the backup power supply, the calculating of the number of pages, the storing of the management information in the first storage medium, and the updating of the position management information are performed.

11. A non-transitory computer readable recording medium having stored therein a program for causing a computer to execute a process, the computer including a first storage medium; the process comprising:
calculating the number of pages used for storing management information in the first storage medium;

setting pages corresponding to the calculated number of pages as free pages and storing the management information in the set free pages to thereby store the management information in the first storage medium; and updating position management information that indicates a storage position of the management information in the first storage medium.

12. The non-transitory computer readable recording medium according to claim 11, wherein the process further comprises: storing the management information in a second storage medium and storing the management information stored in the second storage medium in the free pages.

13. The non-transitory computer readable recording medium according to claim 11, wherein the process further comprises: dividing a data size of the management information by the size of the pages to calculate the number of pages.

14. The non-transitory computer readable recording medium according to claim 11, wherein the calculating of the number of pages, the storing of the management information in the first storage medium, and the updating of the position management information are performed while a backup power supply that supplies power in a power-cut state of a main power supply supplies power.

15. The non-transitory computer readable recording medium according to claim 14, wherein the process further comprises:

assigning one page that has already been assigned to the management information to new management information to update the position management information according to the assignment; and storing the new management information in the one page to store the management information in the first storage medium, and when a predicted time required for a process of storing the management information in the first storage medium when the position management information was updated according to the storing is equal to or longer than a time allocatable to storing of the management information in the first storage medium within a remaining discharge time of the backup power supply, the calculating of the number of pages, the storing of the management information in the first storage medium, and the updating of the position management information are performed.

* * * * *